United States Patent [19]
Iwata et al.

[11] Patent Number: 5,892,597
[45] Date of Patent: Apr. 6, 1999

[54] HOLOGRAPHIC RECORDING APPARATUS AND HOLOGRAPHIC OPTICAL ELEMENT

[75] Inventors: Shigetake Iwata; Satoshi Maeda; Shigeo Kayashima; Shinya Hasegawa, all of Kawasaki, Japan

[73] Assignee: Fujitsu Limited, Kawasaki, Japan

[21] Appl. No.: 877,581

[22] Filed: Jun. 17, 1997

Related U.S. Application Data

[63] Continuation of Ser. No. 274,146, Jul. 14, 1994, abandoned, which is a continuation of Ser. No. 933,244, Aug. 21, 1992, abandoned.

[30] Foreign Application Priority Data

| Aug. 29, 1991 | [JP] | Japan | 3-218971 |
| Sep. 17, 1991 | [JP] | Japan | 3-236147 |
| Jun. 30, 1992 | [JP] | Japan | 4-173336 |

[51] Int. Cl.⁶ .............. G03H 1/12; G03H 1/00; G03H 1/26
[52] U.S. Cl. .............. 359/11; 359/1; 359/10; 359/12; 359/22; 359/30
[58] Field of Search .............. 359/1, 10, 11, 359/12, 22, 25, 30

[56] References Cited

U.S. PATENT DOCUMENTS

| 3,578,845 | 5/1971 | Brooks et al. | 350/162 R |
| 3,632,214 | 1/1972 | Chang et al. | 359/10 |
| 3,659,947 | 5/1972 | Neumann | 359/10 |
| 3,682,526 | 8/1972 | Matsumoto | 359/30 |
| 4,455,061 | 6/1984 | Case | 350/3.75 |
| 4,547,037 | 10/1985 | Case | 350/3.75 |
| 4,995,685 | 2/1991 | Armstrong et al. | 359/30 |
| 5,016,951 | 5/1991 | Deason et al. | 350/3.67 |
| 5,083,219 | 1/1992 | Jannson et al. | 359/1 |
| 5,132,812 | 7/1992 | Takahashi et al. | 359/9 |
| 5,142,385 | 8/1992 | Anderson et al. | 359/30 |
| 5,151,799 | 9/1992 | Ansley | 359/30 |
| 5,225,918 | 7/1993 | Taniguchi et al. | 359/30 |

FOREIGN PATENT DOCUMENTS

| 0 140 594 | 5/1985 | European Pat. Off. . |
| 0 240 262 | 10/1987 | European Pat. Off. . |
| 0 423 680 A3 | 4/1991 | European Pat. Off. . |
| 0 467 601 A2 | 1/1992 | European Pat. Off. . |
| 2 366 607 | 9/1977 | France . |
| 206401 | 9/1997 | Japan . |
| 2 195 784 | 4/1988 | United Kingdom . |

OTHER PUBLICATIONS

Patent Abstracts of Japan, vol. 9, No. 24 (P–331) Jan. 31, 1985 & JP–A–59 168 403 (Sumitomo Denki Kogyo KK).
IBM Technical Disclosure Bulletin, vol. 13, No. 12, May 1971, New York, pp. 3687–3690, E. G. Lean et al., "Device for making High–Resolution Interdigital Transducers".
SPIE, vol. 240, Periodic Structures, Gratings, Moire Patterns and Diffraction Phenomena (1980), pp. 13–17, "Holographic Surface Grating Fabrication Techniques".
Applied Optics, vol. 25, No. 18, Sep. 1986, New York, pp. 3171–3178, C. C. IEMMI, "Synthesis of Asymmetric Profiles from a Double Grating Interferometer".

(List continued on next page.)

*Primary Examiner*—Cassandra Spyrou
*Assistant Examiner*—Audrey Chang
*Attorney, Agent, or Firm*—Armstrong, Westerman, Hattori, McLeland & Naughton

[57] ABSTRACT

A holographic recording apparatus includes first and second light sources for respectively generating first and second light beams. A mask is located in front of a hologram recording material and has an aperture. Interference fringes are recorded in a hologram cell on the hologram recording material corresponding to the aperture. A movement mechanism supports the hologram recording material masked by the mask and relatively moves the hologram recording material with respect to the mask in predetermined directions so that an interference pattern is formed in an area on the hologram recording material. A spatial frequency changing mechanism changes incident angles of the first and second light beams with respect to the mask.

12 Claims, 16 Drawing Sheets

OTHER PUBLICATIONS

Optics Communications, vol. 67, No. 2, Jul. 1, 1988, Amsterdam, NL, pp. 195–198, Qing–Shin Ru et al., "An Interferometric Method for Making Equispaced Circular Gratings".

Applied Optics, vol. 24, No. 19, Oct. 1985, New York, pp. 3155–3161, Xu Mai et al., "Simple Versatile Method for Fabricating Guided–Wave Gratings".

Journal of Applied Physics, vol. 66, No. 5, Sep. 1, 1989, New York, pp. 2229–2231, Wei Dong Chi et al., "A Simple Process to Generate Deeply Modulated and large Dimension Submicron Gratings on Reflecting Surfaces".

Thin Solid Films, vol. 72, No. 3, Oct. 1980, Lausanne, DH, pp. 419–416, A. Suzuki et al., "Fabrication of Chirped Gratings on GaAs Optical Waveguides".

Patent Abstracts of Japan, vol. 9, No. 20 (P–330) (1743) Jan. 26, 1985 (JPA 59 166 913—Toppan Insatsu K.K. *abstract*).

Richard C. Kim, "Holographic Beamsplitter for Multiple Plane Wave Formation with Matched Phasefronts", SPIE vol. 1052 Holographic Optics, 1989, pp. 52–64.

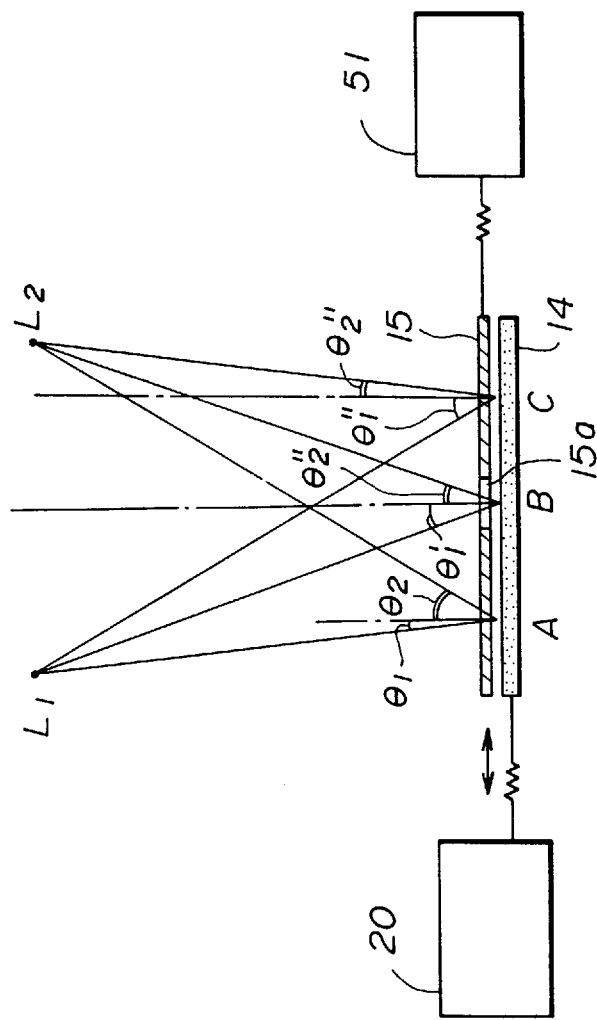

FIG.13A  FIG.13B  FIG.13C
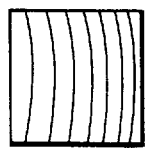 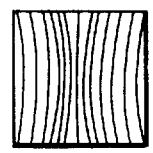 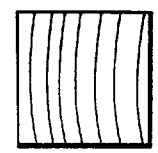
FIG.14
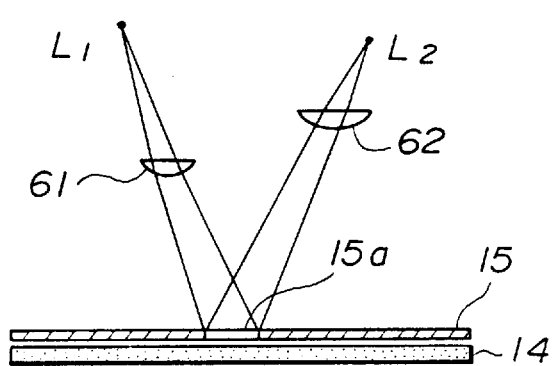

HOLOGRAPHIC RECORDING APPARATUS AND HOLOGRAPHIC OPTICAL ELEMENT

This application is a continuation of application Ser. No. 08/274,146 filed Jul. 14, 1994, now abandoned, which is a continuation of application Ser. No. 07/933,244 filed Aug. 21, 1992, now abandoned.

BACKGROUND OF THE INVENTION

1. Field of the Invention

The present invention generally relates to a holographic recording apparatus for recording interference fringes on a hologram recording material.

2. Description of the Prior Art

Recently, with the spread of laser beam printers, bar-code readers and the like, there has been a considerable demand for devices utilizing optical technology. Holographic optical elements are very attractive because they are suitable for mass production with low cost, and are capable of easily producing special aberration waves, as compared with optical lenses. A holographic optical element is a diffraction grating having a periodic structure formed on a hologram recording material. It is possible to make holographic optical elements have various optical characteristics by adjusting, for example, spatial frequencies, that is, by adjusting intervals between fringes.

Two methods are known which produce holographic optical elements having fringe patterns on a hologram recording material. A first conventional production method utilizes interference of two or more light beams. The first method is called a holographic exposure method. A second conventional production method uses an electron or laser beam exposure apparatus in which interference fringes are directly formed on a hologram recording material in accordance with phases calculated by a computer beforehand. The above second method is called a computer generated hologram method.

The holographic exposure method is capable of producing a large-area hologram having a high spatial frequency in a short time. However, it is very difficult to produce a holographic optical element having desired interference fringes. The computer generated hologram method is capable of forming desired fringe patterns, but is not capable of producing interference patterns having high spatial frequencies. For example, the holographic exposure method is capable of producing an interference pattern having a spatial frequency of 1000–2000 /mm, while the computer generated hologram method has an ability to produce an interference pattern having a spatial frequency between 100 and a few hundred per millimeter. In order to obtain an interference pattern having a high spatial frequency, it is necessary to scale down an interference pattern formed by the computer generated hologram method. Further, the computer generated hologram method cannot form a large hologram area. A maximum hologram area is equal to a few square millimeters. Furthermore, it takes a long time to draw interference patterns by the computer generated hologram method.

SUMMARY OF THE INVENTION

It is a general object of the present invention to provide an apparatus for recording interference fringes on a holographic optical element in which the above disadvantages are eliminated.

A more specific object of the present invention is to provide a holographic recording apparatus in which desired interference patterns can be easily recorded in a short time.

The above objects of the present invention are achieved by a holographic recording apparatus comprising: first light source means for generating a first light beam; second light source means for generating a second light beam; a mask which is located in front of a hologram recording material and which has an aperture, interference fringes being recorded in a (hologram cell) on the hologram recording material corresponding to the appeature; movement means for supporting the hologram recording material masked by the mask and for relatively moving the hologram recording material with respect to the mask in predetermined directions so that an interference pattern is formed in an area on the hologram recording material; and spatial frequency changing means, coupled to the first and second light sources, for changing incident angles of the first and second light beams with respect to the mask.

The above-mentioned objects of the present invention are also achieved by a holographic recording apparatus comprising: a light source; an optical system for generating a light beam from a light emitted from the light source; a mirror for reflecting a part of the light beam; a mask which is located in front of a hologram recording material and which has an aperture directly receiving the light beam from the optical system and receiving the part of the light beams reflected by the mirror, interference fringes being recorded in a hologram cell on the hologram recording material corresponding to the aperture; movement means for supporting the hologram recording material masked by the mask and for relatively moving the hologram recording material with respect to the mask in predetermined directions so that an interference pattern is formed in an area on the hologram recording material; and spatial frequency changing means, coupled to the mirror, for changing a position of the mirror and for thereby changing incident angles of the first and second light beams with respect to the mask.

Yet another object of the present invention is to provide a holographic optical element produced by the above holographic recording apparatus.

This object of the present invention is achieved by a holographic optical element comprising: a hologram recording member; and a plurality of cells formed on the hologram recording member, the cells respectively including interference fringes.

BRIEF DESCRIPTION OF THE DRAWINGS

Other objects, features and advantages of the present invention will become apparent from the following detailed description when read in conjunction with the accompanying drawings, in which:

FIG. 12 is a diagram showing a variation of the third embodiment of the present invention;

FIGS. 13A, 13B and 13C are diagrams showing examples of spatial frequency distributions obtained by the variation shown in FIG. 12;

FIG. 14 is a diagram showing a variation for changing the spatial frequency distribution;

DESCRIPTION OF THE PREFERRED EMBODIMENTS

A description will now be given of a first embodiment of the present invention.

Figure 1:
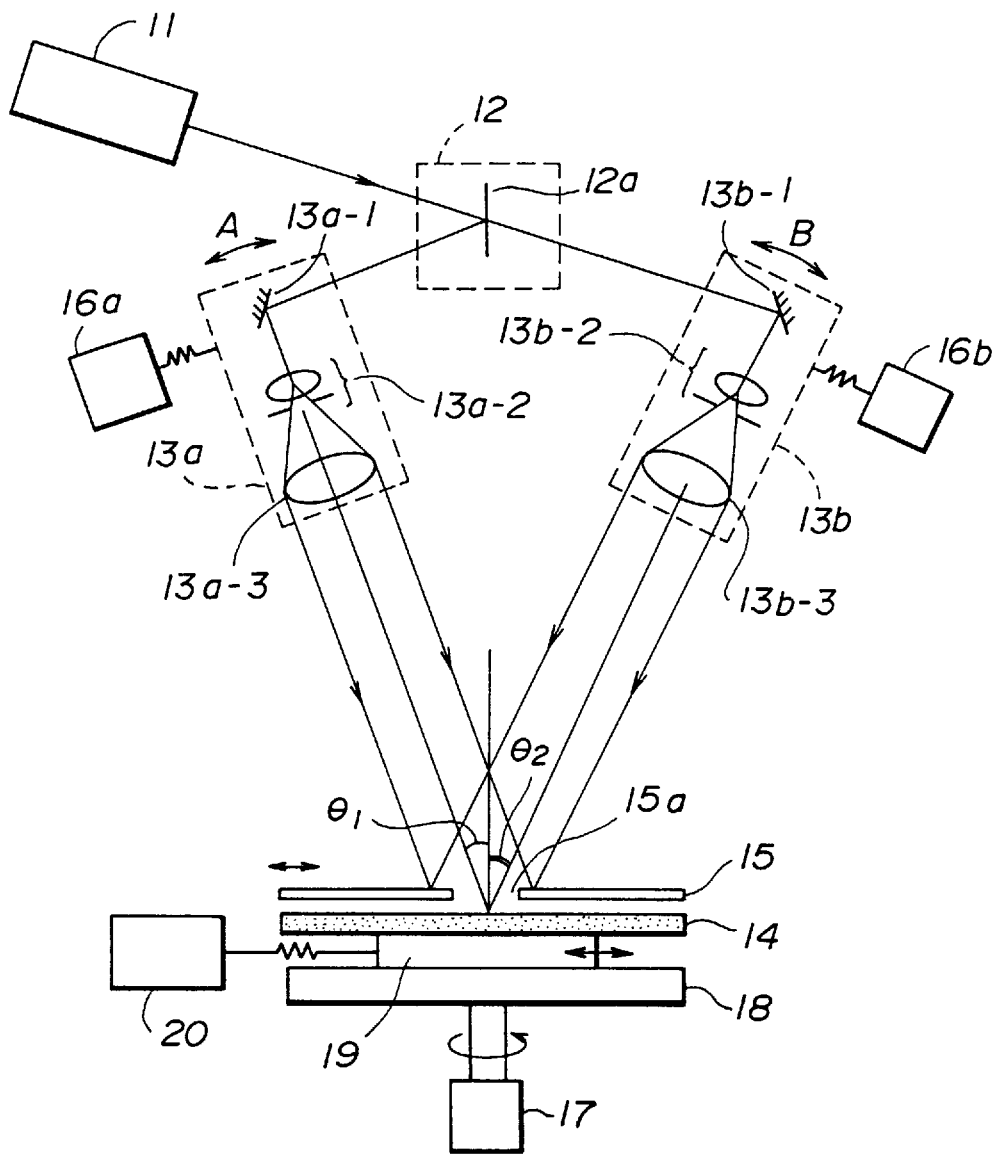
FIG. 1 is a diagram showing an overview of an apparatus for recording interference fringes on a hologram recording material according to a first embodiment of the present invention.

FIG. 1 shows an overview of an apparatus for recording interference fringes on a hologram recording material according to a first embodiment of the present invention. The apparatus shown in FIG. 1 is configured as follows. A coherent light source 11, such as a semiconductor laser, emits a coherent light beam. Examples of the semiconductor laser are a He-Cd layer, an Ar laser and a semiconductor laser. A first optical system 12 comprises a beam splitter 12a, which splits the coherent beam from the light source 11 into two beams. The two beams from the first optical system 12 are received by two second optical systems 13a and 13b. The second optical systems 13a and 13b function to collimate the respective beams and emit collimated beams. The second optical system 13a comprises a mirror 13a-1, a spatial filter 13a-2, and a collimating lens 13a-3. Similarly, the second optical system 13b comprises a mirror 13b-1, a spatial filter 13b-2, and a collimating lens 13b-3. The spatial filters 13a-2 and 13b-2, which are respectively made up of objective lenses and pin holes, function to convert the respective beams into spherical waves. That is, the spatial filters 13a-2 and 13b-2 respectively serve as point sources. The collimating lenses 13a-3 and 13b-3 function to convert the respective spherical waves into collimated light beams.

A light blocking mask 15 has an aperture 15a and is placed above a hologram recording material 14. The mask 15 is supported on a movable table 19, which is linearly moved by a linear movement mechanism 20. The movable table 19 is movably placed on a turn table 18, which table is turned by a turning mechanism 17. The linear movement mechanism 20 can be made up of a ball screw and a motor, such as a stepping motor. It is preferable that the linear movement mechanism 20 has a function of moving the movement table 19 in two dimensions. It is possible to use another linear movement mechanism that moves the movement table 19 in directions perpendicular to the directions realized by the linear movement mechanism 20.

A spatial frequency change mechanism 16a changes the position of the second optical system 13a as shown by arrow A so that the spatial frequency of an interference pattern of a hologram cell defined by the aperture 15a can be changed. Similarly, a spatial frequency change mechanism 16b changes the position of the second optical system 13b as shown by arrow B so that the spatial frequency of the interference pattern facing the aperture 15a can be changed.

Figure 2:
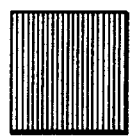
FIG. 2 is a diagram showing an example of interference fringes recorded by the apparatus shown in FIG. 1.

The spatial frequency, labeled f, of interference fringes formed at an incident position on the hologram recording material 14 can be expressed as follows:

$$f=(\sin\theta_1+\sin\theta_2)/\lambda \qquad (1)$$

where $\theta_1$ and $\theta_2$ are respectively incident angles of the two parallel light beams incident to the hologram recording material 14, and $\lambda$ is the wavelength of the light beams. Hence, interference fringes shown in FIG. 2 having the constant spatial frequency f are formed in an area on the hologram recording material 14 corresponding to the aperture 15a. The spatial frequency f can be changed by changing the position of either the second optical system 13a or 13b or both by the spatial frequency change mechanisms 16a and 16b, as indicated by the arrows A and B. In this manner, either the incident angle $\theta_1$ or $\theta_2$ or both can be changed.

The two light beams are projected onto the hologram cell at the angles $\theta_1$ and $\theta_2$, and superimposed with each other. Hence, uniform interference fringes having a constant spatial frequency f can be formed. As mentioned above, the spatial frequency f can be easily changed by adjusting the incident angles $\theta_1$ and/or $\theta_2$. The hologram recording material 14 is linearly moved by the linear movement mechanism 20, so that continuous hologram cells having respective constant spatial frequencies can be easily formed on a large hologram area. In addition to the linear movement, it is possible to turn the hologram recording material 14 by means of the turning mechanism 17. Hence, hologram cells having interference fringes oriented in different directions within 360° can be formed.

Figure 3:
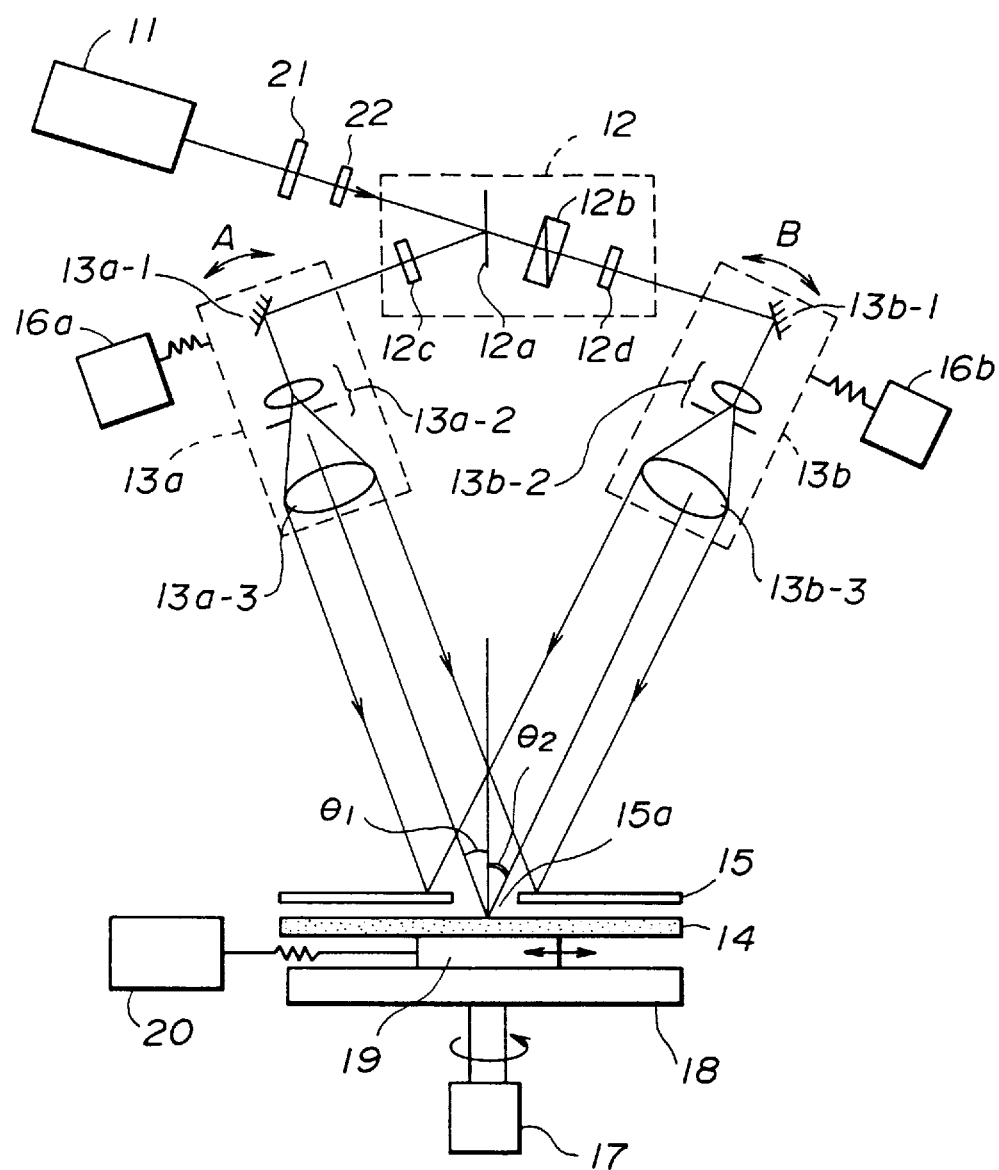
FIG. 3 is a diagram showing the details of the apparatus shown in FIG. 1.

FIG. 3 shows the details of the first embodiment of the present invention shown in FIG. 1. In FIG. 3, parts that are the same as parts shown in FIG. 1 are given the same reference numerals as previously. A shutter 21 and a ND filter 22 are provided between the light source 11 and the first optical system 12. The shutter 21 adjusts an exposure time. The ND filter 22 adjusts the quantity of exposure.

The first optical system 12 comprises, in addition to the beam splitter 12a, a phase adjuster 12b, and two polarizers 12c and 12d. The phase adjuster 12b and the polarizer 12d are disposed between the beam splitter 12a and the second optical system 13b. The polarizer 12c is interposed between the beam splitter 12a and the second optical system 13a. The phases of the interference fringes are based on the difference between the two optical path lengths. The phase adjuster 12b adjusts the relative optical path length by adjusting the position of the phase adjuster 12b. The phase adjuster 12b can be formed with a prism or a Soleil-Babinet compensator. As is well known, the Soleil-Babinet compensator has a screw for phase adjustment. The polarizers 12c and 12d are provided for compensating for degradation of coherency due to a variation in polarization of the laser beams. The polarizers 12c and 12d function to adjust polarization of the respective laser beams. Each of the polarizers 12c and 12d can be formed with a λ/2 plate, an optical rotatory element, or a Faraday rotator.

Figure 4A:
FIGS. 4A, 4B and 4C are diagrams showing examples of interference fringes recorded by the apparatus shown in FIG. 3.
Figure 4B:
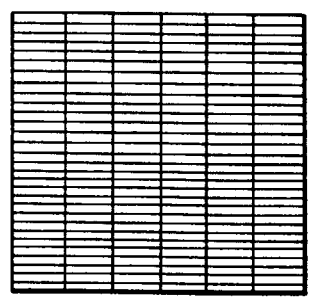

As has been described, it is possible to form uniform interference fringes in a hologram cell having the constant spatial frequency defined by the aforementioned expression (1), as shown in FIG. 4A. The hologram cell is defined by the aperture 15a. When the movement of the hologram recording material and the projection of the two light beams are repeatedly carried out, continuous hologram cells respectively having the spatial frequency can be formed. Further, by moving the hologram recording material 14 in a direction perpendicular to the above movement thereof, it is possible to form interference fringes on the entire surface of the hologram recording material 14, as shown in FIG. 4B.

Figure 4C:
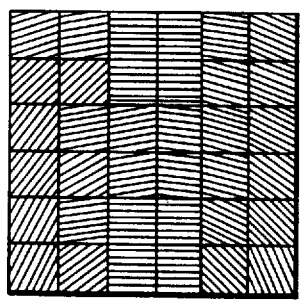

As has been described previously, it is possible to arbitrarily determine the orientations of interference fringes in hologram cells by turning the turn table 18 by means of the turning mechanism 17. By the combination of the linear movement and turning movement, it becomes possible to form interference fringes, as shown in FIG. 4C. There are formed various orientations of the interference fringes in the hologram cells.

As has been described previously, it is possible to change the spatial frequency of interference fringes in each hologram cell by adjusting the position of either the second optical system 13a or 13b or positions of both the second optical system 13a and 13b. Hence, either the incident angle $\theta_1$ or $\theta_2$ or both are changed, and thereby the spatial frequency is changed.

By respectively controlling the spatial frequency change mechanisms 16a and 16b, the turning mechanism 17, and the linear movement mechanism 20, it is possible to form interference fringes having desired spatial frequencies and orientations in hologram cells on the hologram recording material 14. It is preferable to match the phases of the interference fringes in adjacent hologram cells.

Figure 5:
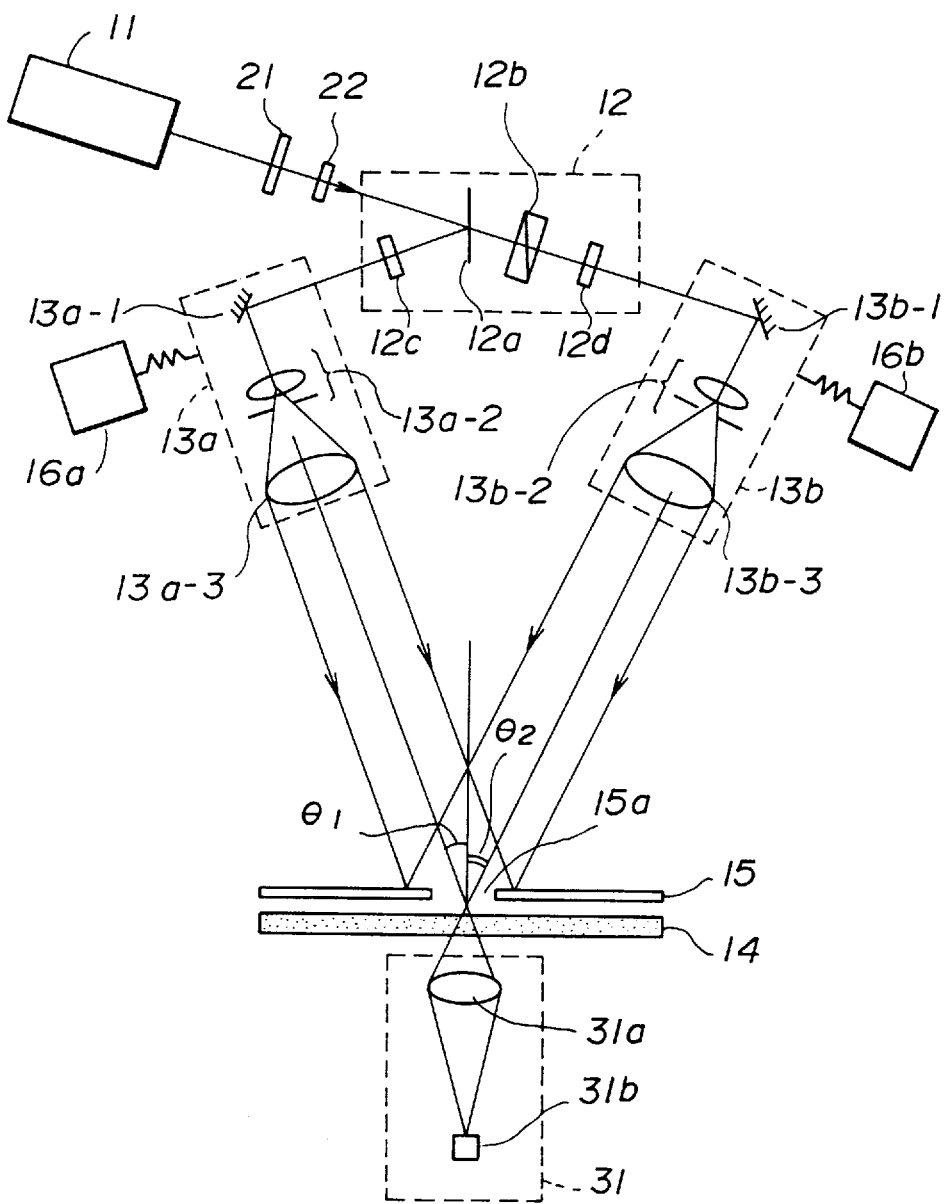
FIG. 5 is a diagram showing a variation of the first embodiment of the present invention.

FIG. 5 shows an apparatus for recording interference fringes on a hologram recording material with a phase adjustment mechanism added thereto. In FIG. 5, parts that are the same as parts shown in the previously described figures are given the same reference numerals as previously. An interference fringe monitor optical system 31 is provided as shown in FIG. 5. The optical monitor system 31 comprises an objective lens 31a and a camera 31b. The optical monitor system 31 may be formed with a microscope system. By observing bright and dark positions of the interference fringes by means of the optical monitor system 31, the phase adjuster 12b is manually adjusted so that the phases of the interference fringes in the adjacent hologram cells match with each other. It is also possible to automatically adjust the phase adjuster 12b by means of an encoder which generates a control signal from a video signal generated by the video camera 31. It is also possible to control the linear movement mechanism 20 by the above control signal generated by the above encoder.

It will be noted that if the spatial frequency of interference fringes is considerably greater than the size of the hologram cell (spatial frequency of a periodic cell array), it is possible to spatially separate desired signals from sampling noise during a reproduction operation.

In the aforementioned structures, the two light beams are collimated by the second optical systems 13a and 13b. Alternatively, it is possible to collimate the light beam from the source 11 and split it into two beams.

Figure 6:
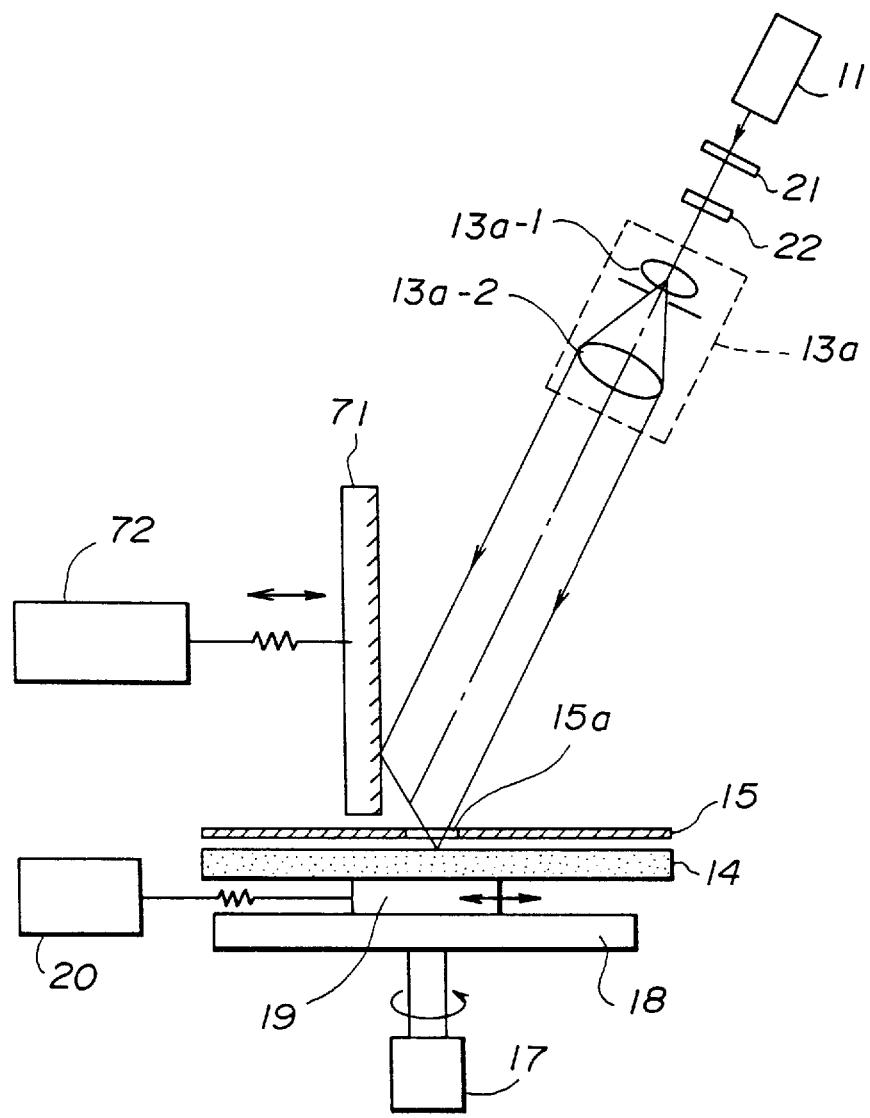
FIG. 6 is a diagram showing an apparatus for recording interference fringes on a hologram recording material according to a third embodiment of the present invention.

A description will now be given, with reference to FIG. 6, of a second embodiment of the present invention. In FIG. 6, parts that are the same as parts shown in the previously described figures are given the same reference numerals as previously. The apparatus shown in FIG. 6 does not have the first optical system 12, the second optical system 13b, or the spatial frequency change mechanisms 16a and 16b. In lieu of these optical systems, a mirror 71 and a mirror movement mechanism 72 are employed. A part of the collimated light beam emitted from the second optical system 13a (in which the mirror 13a-1 is not used) is reflected by the mirror 71 and projected onto the hologram recording material 14 via the aperture 15a. Hence, a hologram cell on the hologram recording material 14 directly receives the light beam from the second optical system 13a and receives the reflected light from the mirror 71. Hence, the spatial frequency defined by the aforementioned expression (1) can be obtained. The mirror 71 is linearly moved by means of the mirror movement mechanism 72. The movement of the mirror 71 changes the optical path length from the mirror 71, and hence changes the phase of the beam. By respectively controlling the mirror movement mechanism 72, the turning mechanism 17 and the linear movement mechanism 20, it is possible to form interference patterns as shown in FIGS. 4A, 4B and 4C. It will be noted that the apparatus shown in FIG. 6 is simpler than that shown in FIG. 1 or FIG. 3. It is possible to use the spatial frequency change mechanism 16b in the same manner as shown in FIG. 1.

Figure 7A:
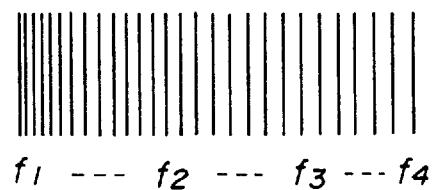
FIGS. 7A, 7B and 7C are diagrams for explaining advantages of the second embodiment of the present invention.
Figure 7B:
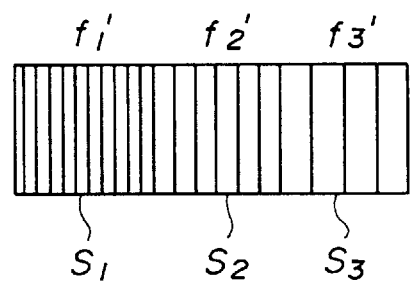
Figure 7C:
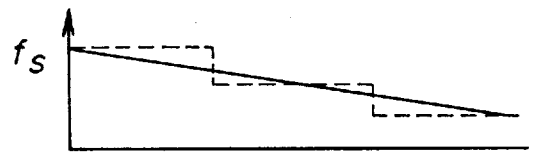

A description will now be given of a third embodiment of the present invention. In the first and second embodiments of the present invention, the spatial frequency in each hologram cell is fixed. If a hologram, in which the frequency continuously changes as shown in FIG. 7A, is produced by the first or second embodiment of the present invention, hologram cells S1, S2 and S3 respectively having fixed spatial frequencies f1', f2' and f3' are formed as shown in FIG. 7B. In this case, the spatial frequencies are discretely changed, as indicated by a solid line in FIG. 7C. However, it is desired that the spatial frequency continuously changes as indicated by a broken line in FIG. 7C. The third embodiment of the present invention is intended to form a hologram in which the spatial frequency continuously changes.

Figure 8:
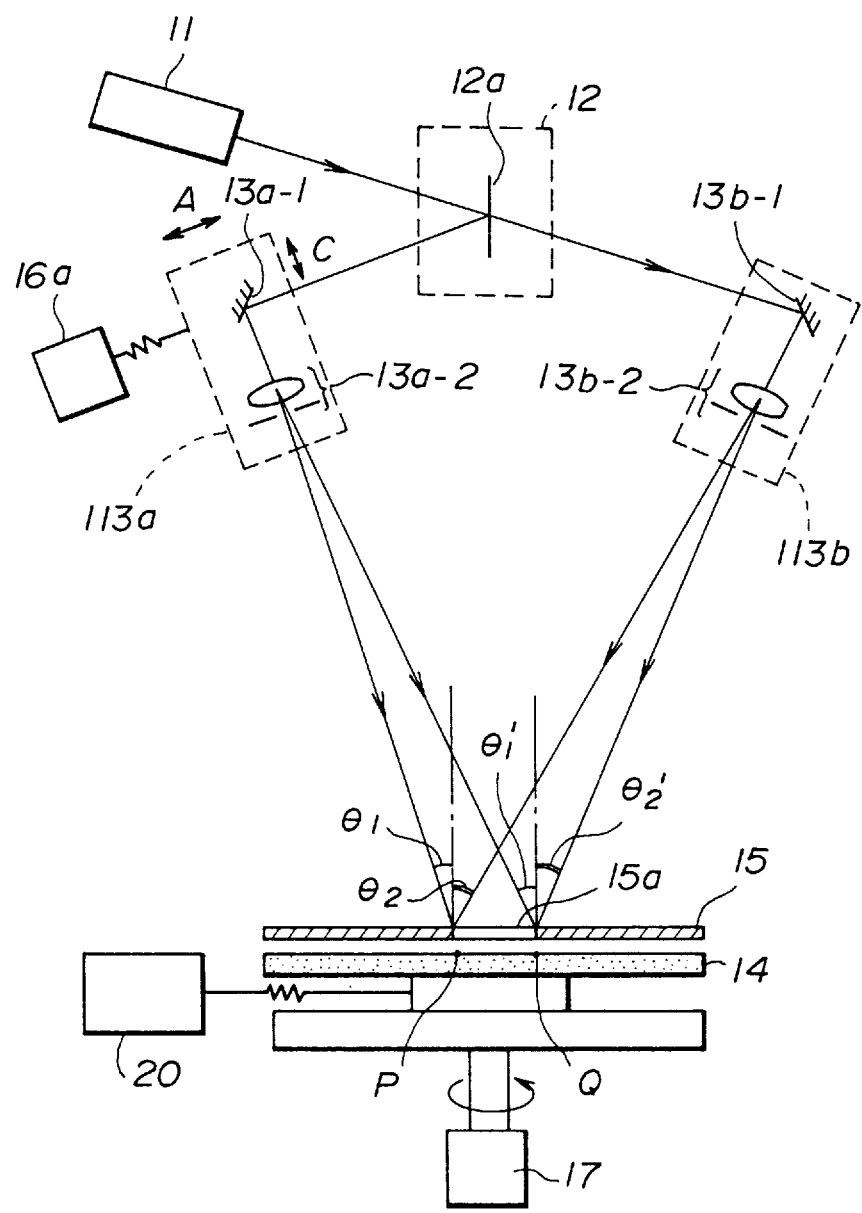
FIG. 8 is a diagram showing an overview of the second embodiment of the present invention.

FIG. 8 shows an overview of the third embodiment of the present invention. In FIG. 8, parts that are the same as parts shown in the previously described figures are given the same reference numerals as previously. The third embodiment of the present invention comprises two second optical systems 113a and 113b in lieu of the aforementioned second optical systems 13a and 13b. The optical system 113a comprises the mirror 13a-1 and the spatial filter 13a-2. That is, the optical system 113a does not have the collimating lens 13a-3 shown in FIG. 1. The optical system 113b comprises the mirror 13b-1 and the spatial filter 13b-2. That is, the optical system 113b does not have the collimating lens 13b-3 shown in FIG. 1. It can be seen from the above that the optical systems 113a and 113b respectively emit the spherical waves. In this regard, the optical systems 113a and 113b respectively serve as point sources L1 and L2, as shown in FIG. 9.

Figure 9:
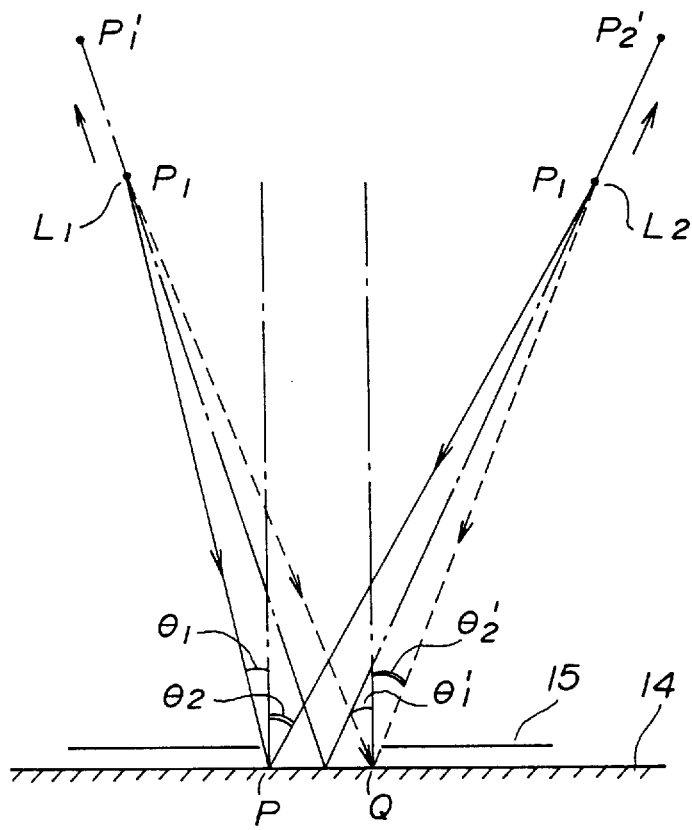
FIG. 9 is a diagram showing a spatial frequency control according to the third embodiment of the present invention.

As shown in FIGS. 8 and 9, a spatial frequency f obtained at point P is expressed as follows:

$$f=(\sin\theta_1+\sin\theta_2)/\lambda \quad (2)$$

where $\theta_1$ and $\theta_2$ are respectively incident angles of the two light beams incident to the hologram recording material 14 at point P, and $\lambda$ is the wavelength of the light beams. A spatial frequency f' obtained at point Q is expressed as follows:

$$f'=(\sin\theta_1'+\sin\theta_2')/\lambda \quad (3)$$

where $\theta_1'$ and $\theta_2'$ are respectively incident angles of the two light beams incident to the hologram recording material 14 at point Q. The incident angle of the laser beam from the light source L1 gradually increases from point P to point Q. The incident angle of the laser beam from the light source L2 gradually decreases from point P to point Q. Hence, the spatial frequency of interference fringes in a hologram cell defined by the aperture 15a gradually changes between the spatial frequencies f and f'.

The spatial frequency distributions are defined by the above expressions (2) and (3), and can be changed by changing the incident angle of either the light beam from the source L1 or the light beam from the light source L2 or both. The apparatus shown in FIG. 8 comprises the spatial frequency change mechanism 16a in the same manner as shown in FIG. 1. It is also possible for the spatial frequency change mechanism 16a to move the optical system 113a in axial directions thereof, as indicated by arrow C in FIG. 8. It is possible to control the position of the second optical system 113b by means of a spatial frequency change mechanism. It is also possible to control the positions of the optical systems 113a and 113b.

Figure 10:
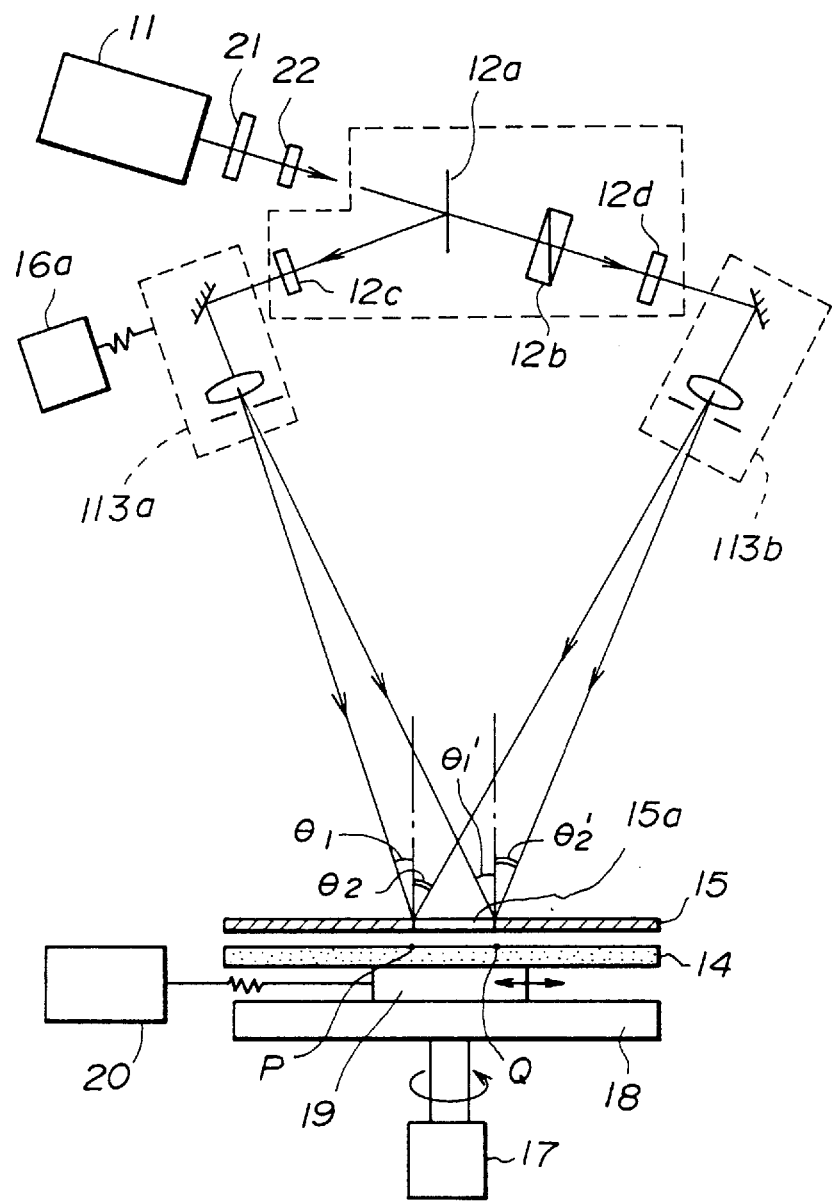
FIG. 10 is a diagram showing the details of the third embodiment of the present invention.

FIG. 10 shows the details of the third embodiment of the present invention shown in FIG. 8. In FIG. 10, parts that are the same as parts shown in FIG. 8 are given the same reference numerals as previously. As in the case of the configuration shown in FIG. 3, the apparatus shown in FIG. 10 comprises the shutter 21, the ND filter 22, the phase adjuster 12b, and two polarizers 12c and 12d. These structural parts function in the same manner as has been described previously. It is preferable that an interference fringe monitoring system be used as in the case shown in FIG. 5.

Figures 11A, 11B:
FIGS. 11A, 11B and 11C are diagrams showing examples of spatial frequency distributions obtained by the third embodiment of the present invention.
Figure 11C:
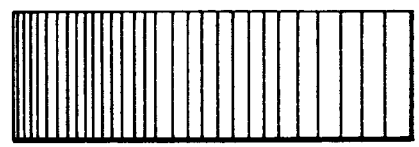

FIG. 11A shows a spatial frequency distribution (interference fringes) obtained when the point sources L1 and L2 are located at positions P1 and P2, as shown in FIG. 9. FIG. 11B shows a spatial frequency distribution obtained when the point source L2 is moved to a position P2'. When the point source L1 is moved to a position P1', a pattern symmetrical to the pattern shown in FIG. 11B is obtained. FIG. 11C shows a spatial frequency distribution in a plurality of continuous hologram cells in which the spatial frequency gradually changes so that it decreases from the left-hand side to the right-hand side. In this case, the spatial frequency change mechanism 16a, the turning mechanism 17 and the linear movement mechanism 20 are respectively controlled. During this process, it is preferable that the phases of interference fringes in adjacent hologram cells are continuous. For this purpose, an optical monitor system as shown in FIG. 5 is used.

It is possible to change the spatial frequency distribution by means of a structure shown in FIG. 12. A mask movement mechanism 51 moves the position of the mask 15. When the position of the aperture 15a of the mask 15 is moved in directions indicated by an arrow shown in FIG. 12, the incident angles of the light beams from the light sources L1 and L2 are changed as follows:

$$\theta_1, \theta_2 \rightarrow \theta_1', \theta_2' \rightarrow \theta_1'', \theta_2''.$$

Hence, the spatial frequency in the hologram cell can be changed in accordance with the expression (2).

FIG. 13A shows a spatial frequency distribution in a hologram cell obtained when the aperture 15a is located at position A. FIG. 13B shows a spatial frequency distribution in a hologram cell obtained when the aperture 15a is located at position B. FIG. 13C shows a spatial frequency distribution in a hologram cell obtained when the aperture 15a is located at position C. When the aperture 15a is located with a position symmetrical to the position A, a spatial frequency distribution symmetrical to that shown in FIG. 13A is obtained.

FIG. 14 shows another structure for changing the spatial frequency distribution. Optical elements 61 and 62 are provided, as shown in FIG. 14. More particularly, the optical element 61 is placed between the light source L1 and the mask 15, and the optical element 62 is placed between the light source L2 and the mask 15. Each of the optical elements 61 and 62 is formed with, for example, a lens, a prism, or a diffraction grating. By changing the optical characteristics of the optical elements 61 and 62 and/or changing the positions thereof, it is possible to change the incident angles of the spherical waves. For example, lenses having different focusing distances are selectively used. Prisms having different apex angles are used. Diffraction gratings having different spatial frequencies are used.

It will be noted that when the distance between the optical systems 113a and 113b and the hologram recording material 14 is sufficiently large with respect to the size of the hologram cell, the third embodiment of the present invention is capable of recording interference fringes having a substantially constant spatial frequency in each hologram cell as in the case of the first and second embodiments of the present invention.

Figure 15:
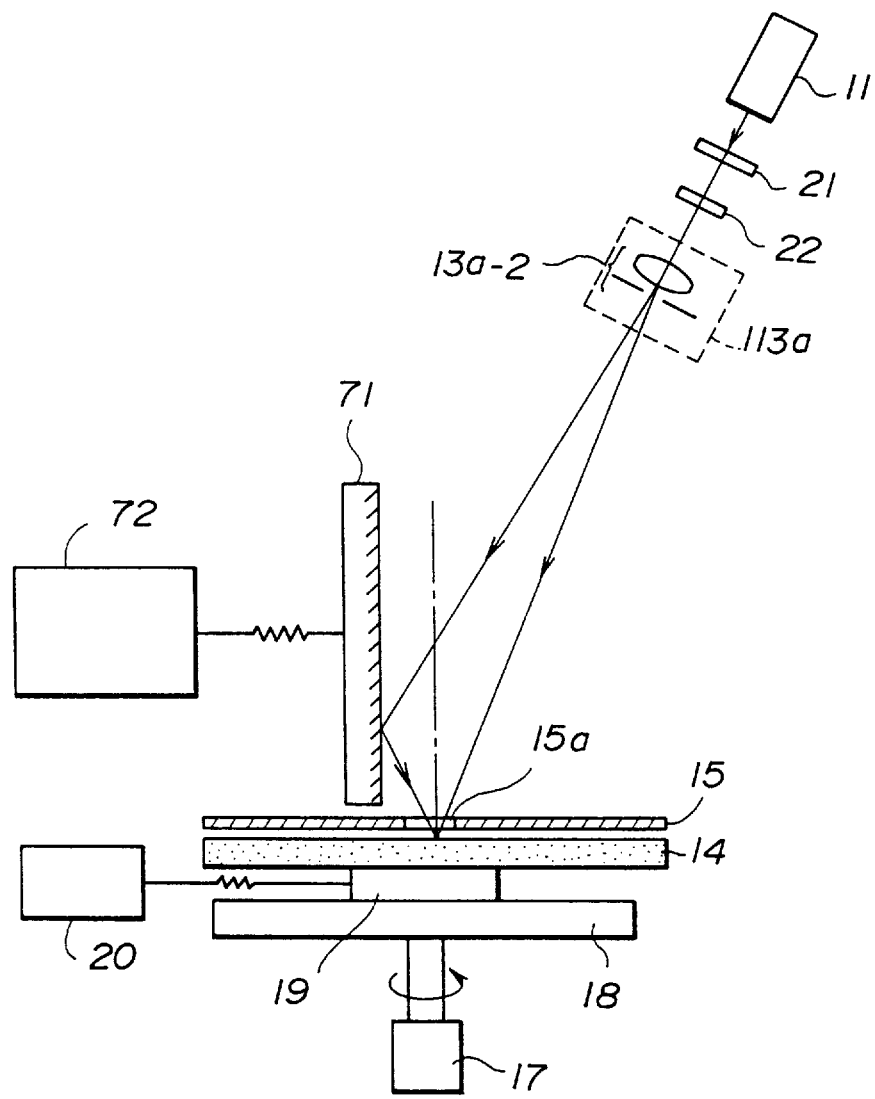
FIG. 15 is a diagram showing an apparatus for recording interference fringes on a hologram recording material according to a fourth embodiment of the present invention.

A description will now be given, with reference to FIG. 15, of a fourth embodiment of the present invention. In FIG. 15, parts that are the same as parts shown in the previously described figures are given the same reference numerals as previously. The fourth embodiment of the present invention can be configured by modifying the third embodiment of the present invention in the same manner as in the case of the second embodiment of the present invention shown in FIG. 6. That is, the optical system 113a, which does not include the mirror 13a-1, is used, and the optical system 113b is not used. The mirror 71 and the mirror movement mechanism 72 shown in FIG. 6 are used in the same manner as previously. By controlling the position of the mirror 71, it is possible to change the spatial frequency distribution.

A description will now be given, with reference to FIG. 16, of a fifth embodiment of the present invention. The fifth embodiment uses a spherical wave emitted from a point source, and an aspherical wave which has been phase-modulated generated by, for example, a deformable mirror device. With this structure, it becomes possible to record complex aspherical waves with high precision.

Figure 16:
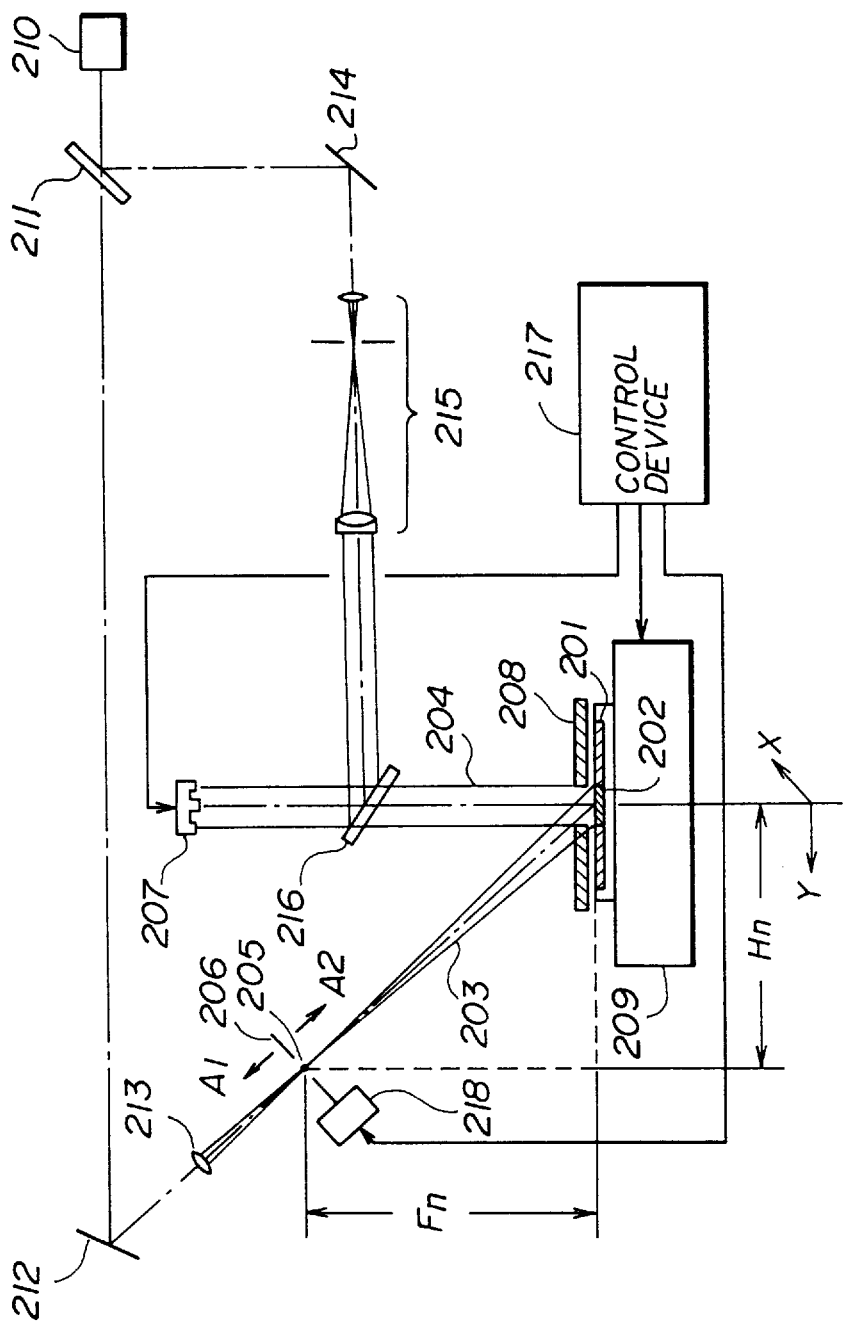
FIG. 16 is a diagram showing an apparatus for recording interference fringes on a hologram recording material according to a fifth embodiment of the present invention.

Referring to FIG. 16, an apparatus for recording interference fringes on a hologram recording material comprises the following structural parts. A beam splitter 211 splits a light beam emitted from a light source 210, such as a semiconductor laser, into two beams. One of the beams is reflected by a mirror 212, and the other beam is reflected by a mirror 214. A lens 213 receives the beam reflected by the mirror 212 and converts it into a spherical wave 203. A pin hole plate 206 functions to adjust the position of a point source 205. A beam expander 215 expands the beam reflected by the mirror 214. The expanded beam is applied to a half-mirror 216. A deformable mirror device 207 receives the beam reflected by the half-mirror 216 and reflects it. The deformable mirror device includes fine mirrors arranged so that a matrix of fine mirrors is formed. The heights of the fine mirrors can be adjusted by piezoelectric elements. Light components respectively projected onto the fine mirrors are modulated based on the heights of the fine mirrors. In this manner, an aspherical wave is generated and passes through the half-mirror 216. Reference number 204 indicates the above aspherical wave.

A hologram recording material 201 is placed on a stage 209. A light blocking mask 208 having an aperture is located above the hologram recording material 201. A control device 217 includes an actuator, which moves the stage 209 in X and Y directions where the origin of the (X, Y) coordinates is located at the center of the mask 8. The X axis extends from the front surface of the sheet to the back surface thereof via the origin. The Y axis extends from the origin to the left-hand side of the sheet. A mechanism for moving the stage 209 can be formed with a conventional mechanism. The stage 209 is moved so that a hologram cell 202 faces the aperture in the mask 208. The control device 217 also generates control signals, which signals are applied to piezoelectric elements of the deformable mirror device 207. The control signals function to adjust the heights of the fine mirrors of the deformable mirror device 207. The pin hole plate 206 is moved in directions A1 and A2 by means of a pin hole plate driving device 218. The directions A1 and A2 correspond to an optical axis of the spherical wave 203. The control device 217 generates a control signal for controlling the pin hole plate driving device 218.

A mechanism in which a hologram (interference fringes) is generated will now be described. It will now be assumed that the wave surface of a hologram to be generated has a phase $\Phi(X, Y)$. The phase $\Phi(X, Y)$ of the wave surface of the hologram is approximately determined by using the phase of the spherical wave 203. In order to realize the above approximation, the recording surface of the hologram recording material 201 is grouped into hologram cells 202 dependent on the size of the aperture in the mask 208, and holograms are sequentially generated for the respective hologram cells 202.

Figure 17:
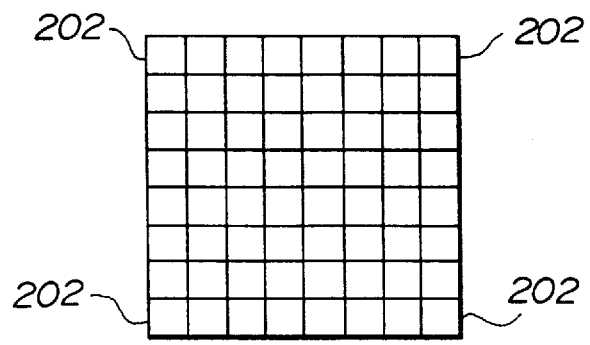
FIG. 17 is a diagram showing how a hologram recording material is divided into hologram cells.

FIG. 17 shows hologram cells 202 arranged in rows and columns. The aforementioned first to fourth embodiments of the present invention also use hologram cells arranged in rows and columns, as shown in FIG. 17. In FIG. 17, 64 hologram cells (8×8) 202 are defined on the hologram recording material 201. Each of the hologram cells 202 has a substantially square shape, and the length of each cell is equal to, for example, 100 $\mu$m. Of course, the number of hologram cells depends on the size of the hologram recording material 201.

The stage 209 is moved under control of the control device 217 so that the hologram cell 202, in which a hologram is to be generated, faces the aperture of the mask 208. It will now be assumed that the above hologram cell 202 is the nth hologram cell 202.

Figure 18:
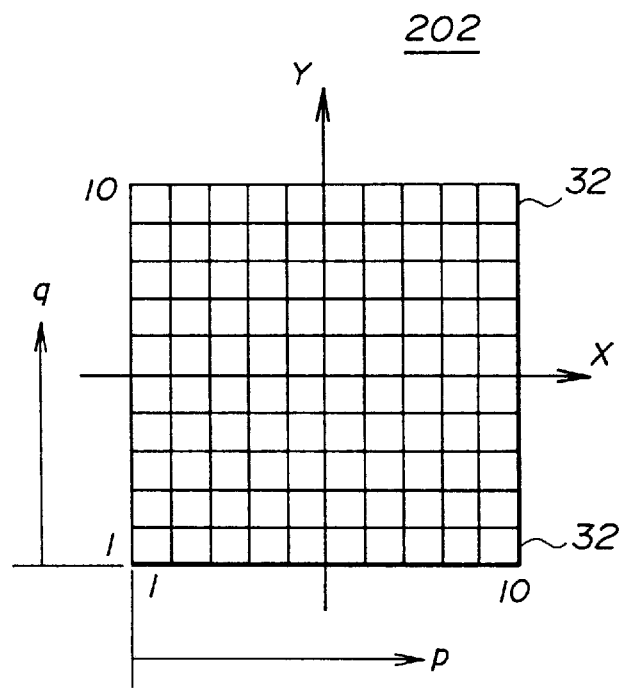
FIG. 18 is a diagram showing how each hologram cell is segmented into a plurality of sections.
Figure 19:
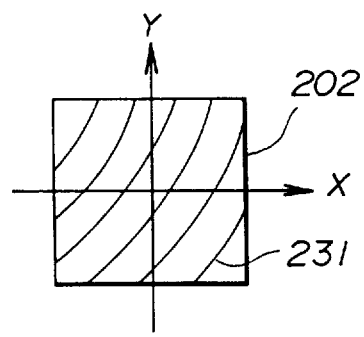
FIG. 19 is a diagram showing an example of a spatial frequency distribution obtained by the fifth embodiment of the present invention.

FIG. 18 shows the nth hologram cell 202. The center of the hologram cell 202 is located at the origin of the (X, Y) coordinates. As shown in FIG. 18, the hologram cell 202 is divided into 32 sections. These sections in the hologram cell 202 correspond to the fine mirrors of the deformable mirror device 207 arranged in rows and columns, as will be described later in detail. That is, each of the 32 sections is a unit section of the phase modulation carried out for the light beam reflected by the mirror 214. FIG. 19 shows an example of interference fringes 231 of a hologram recorded in the hologram cell 202.

Next, the position of the point source 205 is determined so that there is a minimum difference between the phase of the wave surface of a hologram to be recorded and the phase of the spherical wave 203. It will now be assumed that the phase of the wave surface of the hologram to be recorded is denoted as $\Phi^n(X, Y)$, and the phase of the wave surface of the spherical wave 203, to which the phase of the wave surface of the hologram to be recorded is approximated, is denoted as $\Phi_R{}^n(X, Y)$. When the position of the point source 205 with respect to the nth hologram cell 202 is expressed using Fn and Hn shown in FIG. 16, the phase $\Phi_R{}^n(X, Y)$ is written as follows:

$$\phi_R{}^n(X, Y) = K\sqrt{(Fn^2 + X^2 + (Hn - Y)^2)} \quad . \tag{4}$$

It is necessary to minimize the difference between the phase $\Phi^n(X, Y)$ of the wave surface of the hologram to be recorded and the phase $\Phi_R{}^n(X, Y)$ of the wave surface of the spherical wave 203. With the above in mind, the distances Fn and Hn are calculated so that the means square E of the difference between the phase $\Phi^n(X, Y)$ and the phase $\Phi_R{}^n(X, Y)$ is minimized as follows:

$$E = \iint (\phi^n(X, Y) - \phi_R{}^n(X, Y))^2 dX dY. \tag{5}$$

It will now be assumed that the values of Fn and Hn that minimize the mean square E are written as Fnm and Hnm, respectively. The distances Fnm and Fnm are set by moving the pin hole plate 206 by the pin hole plate driving circuit 218 under control of the control device 217. In this manner, the position of the light source 205 with respect to the nth hologram cell 202 is determined. The movement of the pin hole plate 206 can be rapidly carried out.

Then, the heights of the fine mirrors of the deformable mirror device 207 are adjusted so that there is no difference between the hologram to be recorded and the actually recorded hologram in each of the 32 sections shown in FIG. 18.

Figure 20:
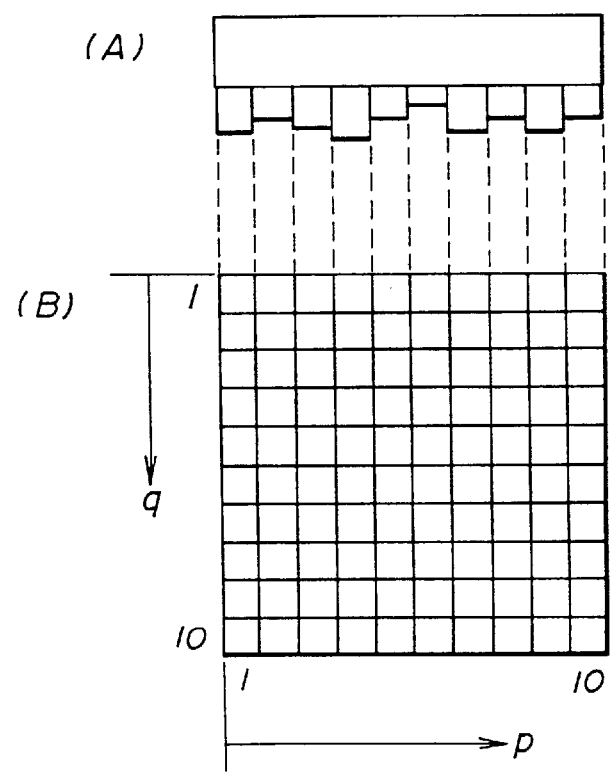
FIG. 20 is a diagram of a deformable mirror device used in the fifth embodiment of the present invention.

FIG. 20 shows the deformable mirror device 207. FIG. 20-(A) is a side view of the deformable mirror device 207 and FIG. 20-(B) is a bottom view thereof. The deformable mirror device 207 has fine mirrors arranged in rows and columns with a pitch of approximately 5 $\mu$m. The heights of the fine mirrors can be separately adjusted by the respective piezoelectric elements. Referring to FIG. 20, the identification numbers of respective mirrors are defined as follows. An identification number p indicates the position of each mirror in the X direction, and an identification number q indicates the position of each mirror in the Y direction. In FIG. 20, the identification number p assumes a number between 0 and 10, and the identification number q assumes a number between 0 and 10. A mirror identified by the identification numbers p and q is referred to as a mirror (p, q).

The hologram cell is divided into 32 sections, as has been described previously with reference to FIG. 18. Each of the 32 sections can be identified by the above-mentioned parameters p and q. That is, the identification numbers p and q identifies sections in the X and Y directions, respectively. The coordinates of each section identified by (p, q) is written as (Xp, Yq).

When the difference between the phase $\Phi^n(X, Y)$ and the phase $\Phi R^n(X, Y)$, that is, an aspherical wave component of a hologram to be recorded, is written as $\Phi_A{}^n(X, Y)$, the following expression can be obtained:

$$\Phi_A{}^n(X, Y) = -(\Phi^n(X, Y) - \Phi_R{}^n(x, y)) \qquad (6).$$

Thus, in (Xp, Yq), the following expression stands:

$$\Phi_A{}^n(Xp, Yq) = -(\Phi^n(Xp, Yq) - \Phi_R{}^n(Xp, Yq)) \qquad (7).$$

The right-hand side of the expression (7) shows the phase difference between the wave surface of the hologram to be recorded and the wave surface of the spherical wave 203. The phase difference thus obtained is converted into a phase difference for each mirror (p, q), and the height of each mirror (p, q) is adjusted based on the phase difference.

The control device 217 applies voltages based on the respective phase differences to the piezoelectric elements respectively coupled to the mirrors of the deformable mirror device 207. This height setting operation can be rapidly performed.

It is preferable that the phase difference between the wave surface of the hologram to be recorded and the wave surface of the spherical wave 203 be calculated using the following expression (8). The phase difference between the wave surface of a hologram to be recorded and the wave surface of the spherical wave 203, that is, the aspherical wave component $\Phi_A{}^n(X, Y)$ of the hologram to be recorded, is written in progression form as follows:

$$\Phi_A{}^n(X, Y) = K \Sigma C_{i+j}{}^n \cdot X^i \cdot Y^j \qquad (8)$$

From the expressions (6) and (8), the following expression (9) stands:

$$-(\phi^n(X, Y) - \phi_R{}^n(X, Y)) = K \Sigma C_{i+j}{}^n \cdot X^i \cdot Y^j. \qquad (9)$$

A coefficient $C_{i+j}{}^n$ of the progression can be obtained by means of an appropriate approximation. By obtaining the coefficient $C_{i+j}{}^n$, it is possible to obtain, from the expression (8), the phase difference between the wave surface of a hologram to be recorded and the wave surface of the spherical wave 203, that is, the aspherical wave component $\Phi_A{}^n(X, Y)$ of the hologram to be recorded. Hence, by substituting (Xp, Yq) into the expression (8), it becomes possible to obtain the phase difference between the wave surface of a hologram to be recorded and the wave surface of the spherical wave 203, that is, the aspherical wave component $\Phi_A{}^n(X, Y)$ of the hologram to be recorded.

In the above-mentioned manner, the position of the point source 205 and the heights of the fine mirrors of the deformable mirror device 207 can be determined, and the phase difference between the spherical wave 203 and the aspherical wave 204 can be defined. In this state, the light beam is emitted from the light source 210, and a hologram is recorded in the nth hologram cell. According to the fifth embodiment of the present invention, it is possible to form complex holograms recorded by aspherical waves with high precision and high speed.

Figure 21:
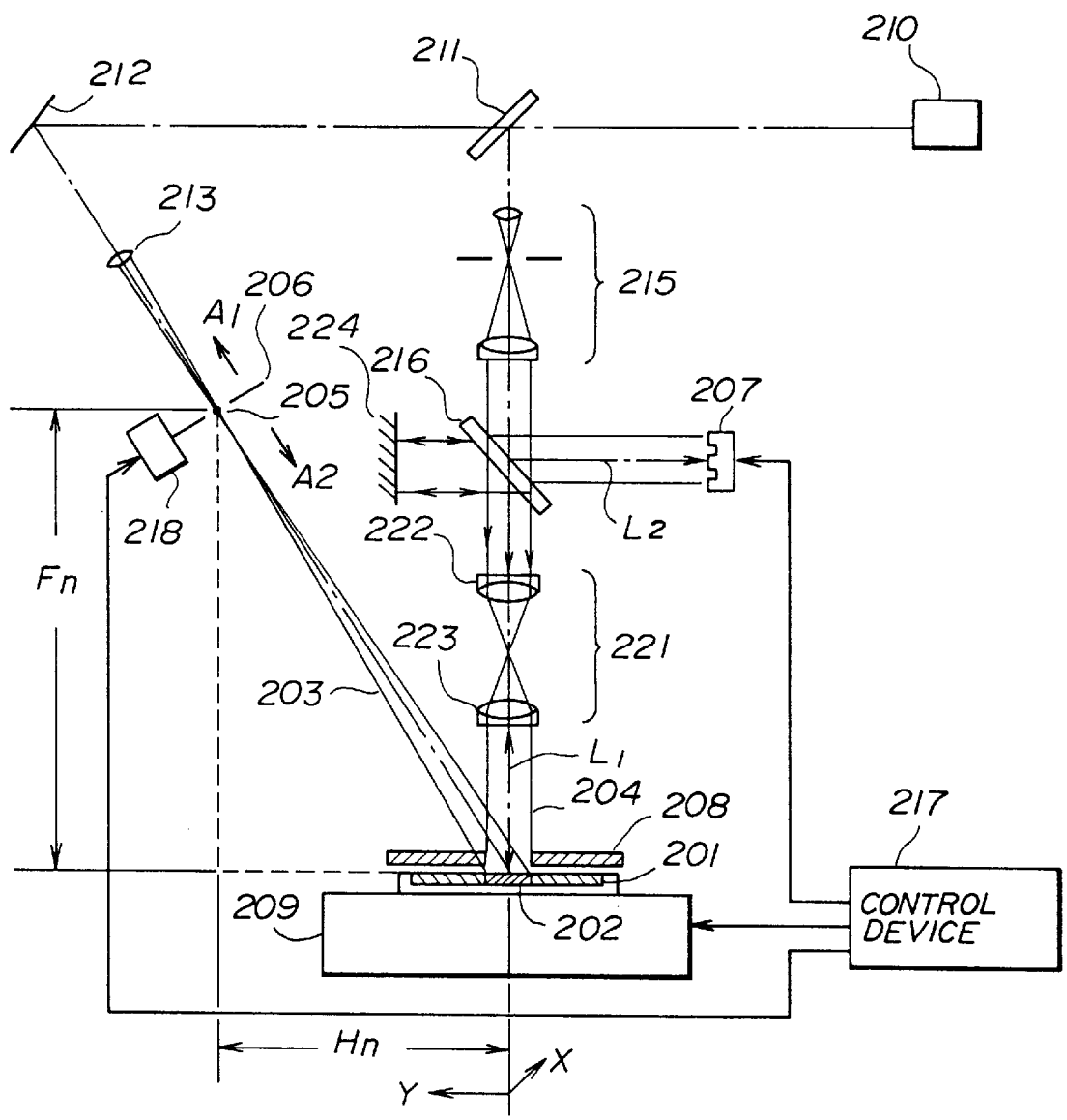
FIG. 21 is a diagram showing an apparatus for recording interference fringes on a hologram recording material according to a sixth embodiment of the present invention.

A description will now be given, with reference to FIG. 21, of a sixth embodiment of the present invention. In FIG. 21, parts that are the same as parts shown in FIG. 16 are given the same reference numerals as previously. In the sixth embodiment shown in FIG. 21, a telescope system 221 is disposed between the deformable mirror device 207 and the hologram recording material 201. When the distance L2 between the deformable mirror device 207 and a optical system 222 in the telescope 211 is set equal to the distance L1 between the hologram recording material 201 and the optical system 222, the telescope (magnification 1:1) makes the phase of the aspherical wave 204 in the hologram cell 202 match the phase of the aspherical wave 204 at the mirrors of the deformable mirror device 207. Hence, it is easy to convert the phase in each section (p, q) in the hologram cell 202 into the height of each mirror (p, q). In FIG. 21, a reference numeral 223 indicates another optical system in the telescope system 221, and a reference numeral 224 indicates a mirror.

The use of the telescope system 221 provides another advantage. If there is a difference between the size of the deformable mirror device 207 and the hologram cell 202, the telescope system 221 provides a magnification that compensates for the above size difference. For example, if the size of the hologram cell 202 is larger than that of the deformable mirror device 207, the telescope system 221 is adjusted so that it has a magnification smaller than 1.

The present invention is not limited to the specifically disclosed embodiments, and variations and modifications may be made without departing from the scope of the present invention.

What is claimed is:

1. A holographic recording apparatus comprising:

a means for generating a light beam and for splitting said light beam into a first light beam and a second light beam;

a mask which is located in front of a hologram recording material and which has an aperture, first interference fringes being recorded in a first hologram cell on the hologram recording material corresponding to said aperture and second interference fringes being recorded in a second hologram cell on the hologram recording material corresponding to said aperture;

movement means for supporting the hologram recording material masked by said mask and for relatively moving the hologram recording material with respect to the mask in predetermined directions so that an interference pattern is formed in an area on the hologram recording material, wherein said movement means includes a first movement means for moving the hologram recording material in a linear direction, and a second movement means for moving the hologram recording material in a rotational direction;

spatial frequency changing means, coupled to said means for generating and splitting said light beam, for changing incident angles of at least one of the first and second light beams with respect to the mask;

phase adjustment means for changing a phase of at least one of the first light beam and the second light beam; and monitor means for monitoring the first and second interference fringes, wherein the phase adjustment means:
(a) changes the phase of at least one of the first light beam and the second light beam on the basis of the interference fringes monitored by said monitor means and (b) causes the phases of the first and second interference fringes in adjacent first and second hologram cells to match each other, wherein the first and second light beams are projected onto an area including at least one of a plurality of hologram cells, while said movement means moves the hologram recording material, wherein said means for generating said light beam and for splitting said light beam generates a spherical wave and an aspherical wave which correspond to said first and second light beams, respectively, and wherein said means for generating said aspherical wave which corresponds to said second light beam comprises a deformable mirror device for phase-modulating the second light beam emitted from the means for generating said light beam in a hologram cell unit, a phase-modulated light from said deformable mirror device corresponding to said aspherical wave.

2. A holographic recording apparatus as claimed in claim 1, wherein said spatial frequency changing means comprises
a means for changing a position of said means for generating said light beam and for splitting said light beam.

3. A holographic recording apparatus as claimed in claim 1, further comprising mask moving means for linearly moving said mask so that interference patterns are recorded in hologram cells on the hologram recording material.

4. A holographic recording apparatus as claimed in claim 1, further comprising polarization rotating elements that respectively rotate polarizations of said first and second light beams.

5. A holographic recording apparatus as claimed in claim 1, wherein said spatial frequency changing means comprises
an optical element disposed between said means for generating said light beam and for splitting said light beam, and said hologram recording material.

6. A holographic recording apparatus as called in claim 1, wherein said means for generating said aspherical wave which corresponds to said second light beam comprises a telescope system disposed between said deformable mirror device and said hologram recording material.

7. A holographic record apparatus as claimed in claim 1, further comprising position adjustment means, coupled to said means for generating said light beam and for splitting said light beam, for changing a position of said means for generating said light beam and for splitting said light beam so that a minimum phase difference between the spherical wave and an interference pattern formed by the interference fringes can be obtained.

8. The holographic recording apparatus as claimed in claim 1, wherein said means for generating said light beam and for splitting said light beam comprises a mirror which reflects a part of said first light beam to thereby generate said second light beam.

9. A holographic recording apparatus comprising:
a means for generating a light beam and for splitting said light beam into a first light beam and a second light beam;
a mask which is located in front of a hologram recording material and which has an aperture, interference fringes being recorded in a hologram cell on the hologram recording material corresponding to said aperture;
movement means for supporting the hologram recording material masked by said mask and for relatively moving the hologram recording material with respect to the mask in predetermined directions so that an interference pattern is formed in an area on the hologram recording material; and
spatial frequency changing means, coupled to said means for generating and splitting said light beam, for changing incident angles of the first and second light beams with respect to the mask,
wherein said means for generating and splitting said light beam generates a spherical wave which corresponds to said first light beam,
and an aspherical wave which corresponds to said second light beam, and comprises
a deformable mirror device for phase-modulating the second light beam emitted from the means for generating said light beam in a hologram cell unit, a phase-modulated light from said deformable mirror device corresponding to said aspherical wave.

10. A holographic recording apparatus comprising:
a means for generating a light beam and for splitting said light beam into a first light beam and a second light beam;
a mask which is located in front of a hologram recording material and which has an aperture, first interference fringes being recorded in a first hologram cell on the hologram recording material corresponding to said aperture and second interference fringes being recorded in a second hologram cell on the hologram recording material corresponding to said aperture;
movement means for supporting the hologram recording material masked by said mask and for relatively moving the hologram recording material with respect to the mask in predetermined directions so that an interference pattern is formed in an area on the hologram recording material;
spatial frequency changing means, coupled to said means for generating and splitting said light beam, for changing incident angles of at least one of the first and second light beams with respect to the mask;
phase adjustment means for changing a phase of at least one of the first light beam and the second light beam; and
monitor means for monitoring the first and second interference fringes, wherein the phase adjustment means: (a) changes the phase of at least one of the first light beam and the second light beam on the basis of the interference fringes monitored by said monitor means and (b) causes the phases of the first and second interference fringes in adjacent first and second hologram cells to match each other, wherein the first and second light beams are projected onto an area including at least one of a plurality of holograms,
wherein said means for generating said light beam generates a spherical wave which corresponds to said first light beam, and an aspherical wave which corresponds to said second light beam, and
wherein said means for generating said light beam includes a deformable mirror device for phase-modulating the second light beam emitted from the means for generating said light beam in a hologram cell unit, a phase-modulated light from said deformable mirror device corresponding to said aspherical wave.

11. A holographic recording apparatus comprising:
a means for generating a light beam and for splitting said light beam into a first light beam and a second light beam;
a mask which is located in front of a hologram recording material and which has an aperture, first interference fringes being recorded in a first hologram cell on the hologram recording material corresponding to said aperture and second interference fringes being recorded in a second hologram cell on the hologram recording material corresponding to said aperture;
movement means for supporting the hologram recording material masked by said mask and for relatively moving the hologram recording material with respect to the mask in predetermined directions so that an interference pattern is formed in an area on the hologram recording material, wherein said movement means includes a first movement means for moving the hologram recording material in a linear direction, and a second movement means for moving the hologram recording material in a rotational direction;

spatial frequency changing means, coupled to said means for generating and splitting said light beam, for changing incident angles of at least one of the first and second light beams with respect to the mask;

phase adjustment means for changing a phase of at least one of the first light beam and the second light beam; and monitor means for monitoring the first and second interference fringes, wherein the phase adjustment means: (a) changes the phase of at least one of the first light beam and the second light beam on the basis of the interference fringes monitored by said monitor means and (b) causes the phases of the first and second interference fringes in adjacent first and second hologram cells to match each other, wherein the first and second light beams are projected onto an area including at least one of a plurality of hologram cells, while said movement means moves the hologram recording material, wherein said means for generating said light beam and for splitting said light beam comprises collimating means for generating first and second collimated light beams which correspond to said first and second light beams, respectively.

12. A holographic recording apparatus comprising:

a means for generating a light beam and for splitting said light beam into a first light beam and a second light beam;

a mask which is located in front of a hologram recording material and which has an aperture, first interference fringes being recorded in a first hologram cell on the hologram recording material corresponding to said aperture and second interference fringes being recorded in a second hologram cell on the hologram recording material corresponding to said aperture;

movement means for supporting the hologram recording material masked by said mask and for relatively moving the hologram recording material with respect to the mask in predetermined directions so that an interference pattern is formed in an area on the hologram recording material, wherein said movement means includes a first movement means for moving the hologram recording material in a linear direction, and a second movement means for moving the hologram recording material in a rotational direction;

spatial frequency changing means, coupled to said means for generating and splitting said light beam, for changing incident angles of at least one of the first and second light beams with respect to the mask;

phase adjustment means for changing a phase of at least one of the first light beam and the second light beam; and monitor means for monitoring the first and second interference fringes, wherein the phase adjustment means: (a) changes the phase of at least one of the first light beam and the second light beam on the basis of the interference fringes monitored by said monitor means and (b) causes the phases of the first and second interference fringes in adjacent first and second hologram cells to match each other, wherein the first and second light beams are projected onto an area including at least one of a plurality of hologram cells, while said movement means moves the hologram recording material, wherein said means for generating said light beam and for splitting said light beam comprises means for generating first and second spherical waves which correspond to said first and second light beams, respectively.

* * * * *